Oct. 6, 1964                D. W. MAYER                3,152,317
                         VEHICLE SENSING MEANS
Filed Aug. 31, 1962                                 2 Sheets-Sheet 2
Fig. 6.
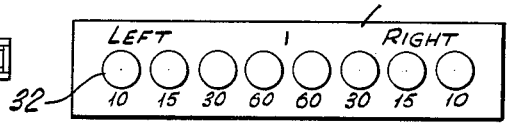
Fig. 7.
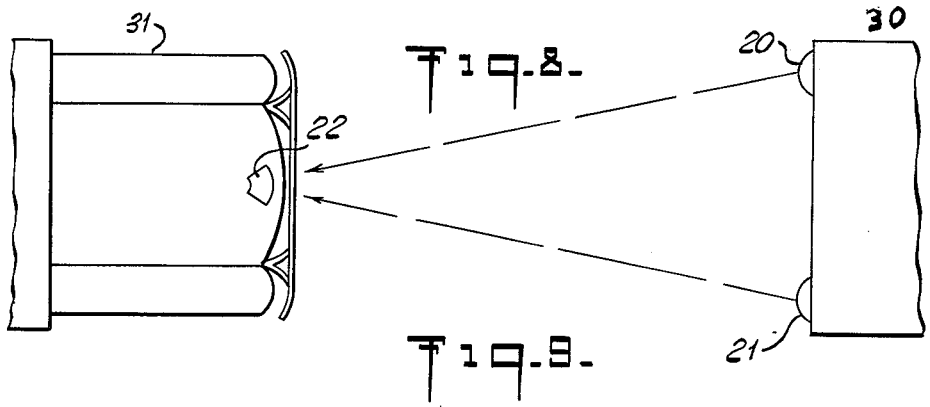
Fig. 8.
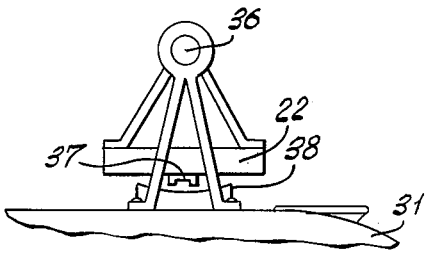
Fig. 9.
Fig. 10.
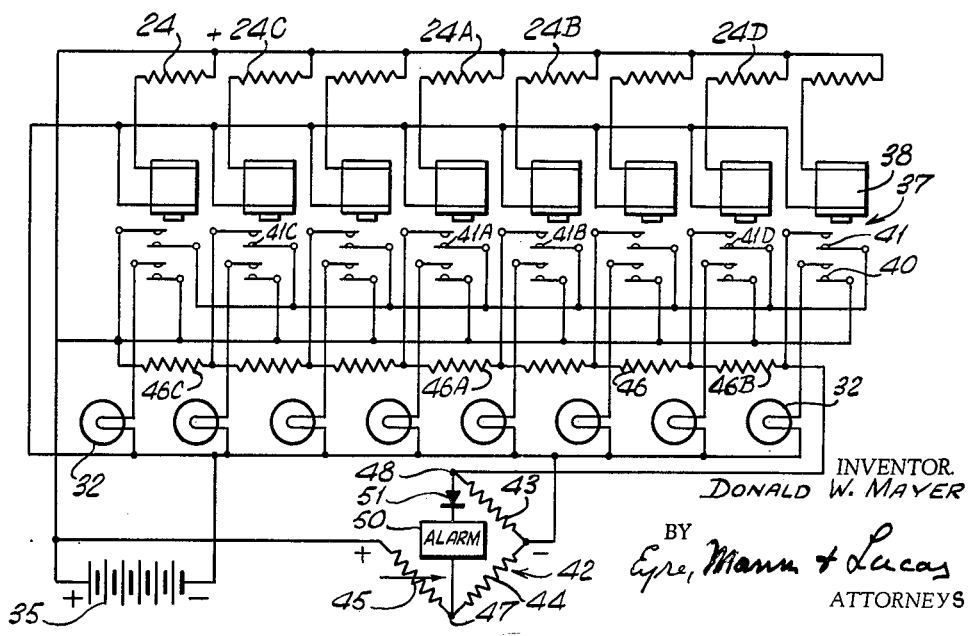
INVENTOR.
DONALD W. MAYER
BY Eyre, Mann & Lucas
ATTORNEYS Oct. 6, 1964    D. W. MAYER    3,152,317
VEHICLE SENSING MEANS
Filed Aug. 31, 1962    2 Sheets-Sheet 1
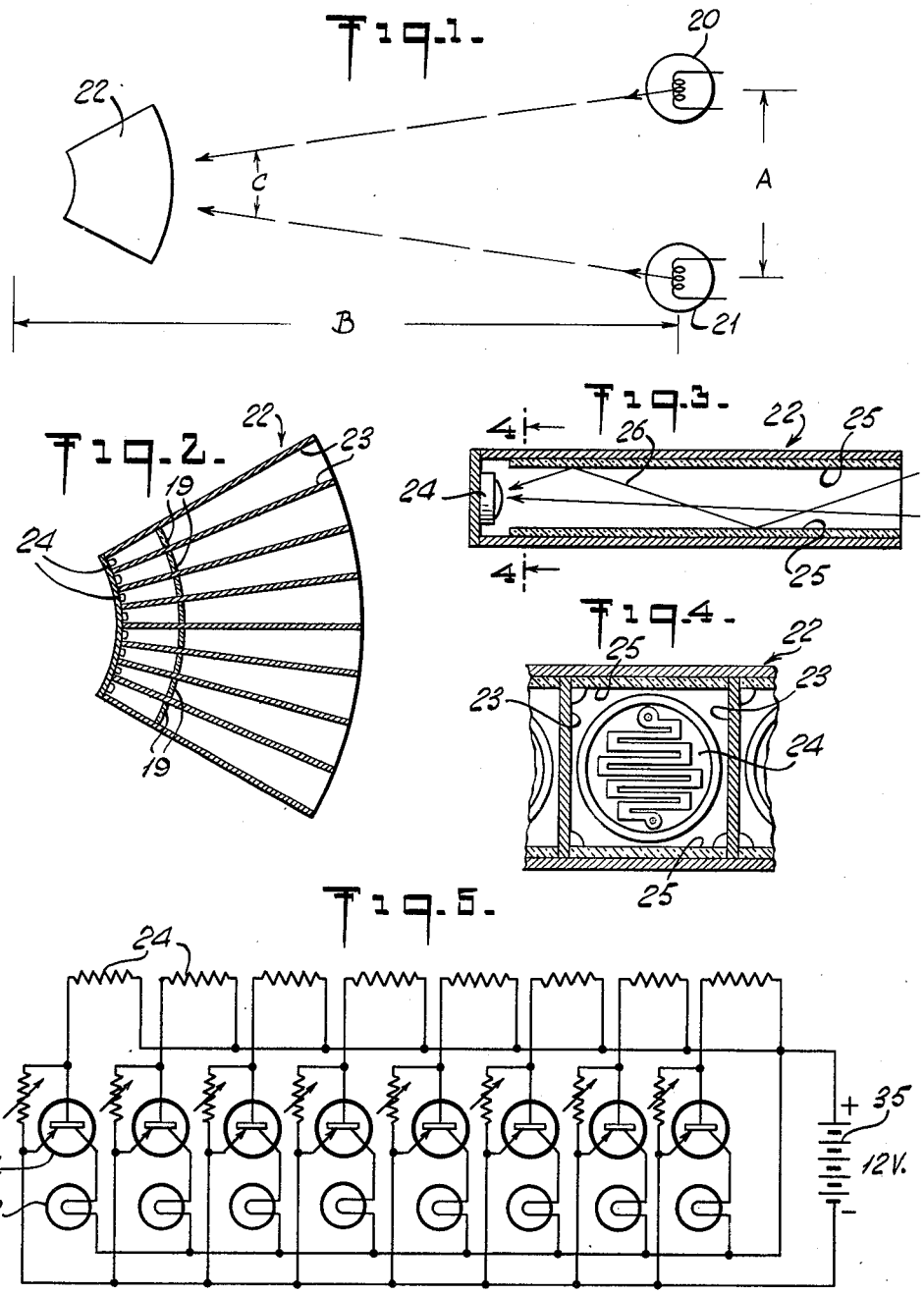
INVENTOR.
DONALD W. MAYER
BY
Eyre, Mann + Lucas
ATTORNEYS

United States Patent Office 3,152,317
Patented Oct. 6, 1964

3,152,317
VEHICLE SENSING MEANS
Donald W. Mayer, New Market, N.J., assignor to Tung-Sol Electric Inc., a corporation of Delaware
Filed Aug. 31, 1962, Ser. No. 220,723
10 Claims. (Cl. 340—34)

This invention relates to a vehicle sensing means for determining the distance between two moving vehicles. The invention has particular reference to a sensing means which indicates the distance between two moving vehicles by means of two lighted lamps which are mounted on the instrument panel of the following vehicle.

This invention has particular application to vehicles such as trucks, airplanes, or motor boats which are traveling in a convoy during a "blackout" in which no visible light can be seen by an outside observer. At present, a convoy of trucks or other vehicles traveling at night must use some form of illumination to maintain the proper separation between the rear end of a leading vehicle and the front end of a following vehicle. This is very difficult to do at night without providing some telltale information to enemy observers on the ground or to airplanes flying overhead. By using the present invention, no visible light is broadcast but a positive system of distance sensing is made available to each vehicle following another vehicle. This means includes the provision of two lamps on the rear end of one vehicle transmitting infra-red light which can be sensed by the following vehicle but cannot be seen by the naked eye. The present system also provides an alarm which may be either visual or acoustic, and is operated when two vehicles are closer than a predetermined distance.

One of the objects of this invention is to provide an improved vehicle sensing means which avoids one or more of the disadvantages and limitations of prior art arrangements.

Another object of the invention is to maintain the proper distance between moving vehicles.

Another object of the invention is to enable the driver of one vehicle to sense a change of direction of a vehicle preceding it.

Another object of the invention is to actuate an alarm when two vehicles get too close to each other.

Another object of the invention is to operate the sensing device by infra-red rays which are not visible to the naked eye.

Another object of the invention is to permit the operation of the sensing device even though the vehicles are moving over a hill or on rough terrain.

The invention comprises a vehicle sensing means which determines the distance between two moving vehicles and includes a pair of lamps mounted at the rear of one vehicle for directing two beams of light toward a second following vehicle. A light sensing means is mounted at the front of the second vehicle and includes a plurality of hollow tubes set in an angular array for selectively receiving light from the lamps. A photosensitive transducer is mounted at the exit end of each tube for converting the light beams into electrical current. Circuit means are provided for each transducer for applying the currents received to a series of lamps.

One feature of the invention includes an alarm circuit connected to a Wheatstone bridge for informing the operator when the vehicles are too close together.

For a better understanding of the present invention, together with other and further objects thereof, reference is made to the following description taken in connection with the accompanying drawings.

FIG. 1 is a schematic diagram showing the relationship between two lamps on one vehicle and a sensing device on the following vehicle.

FIG. 2 is a cross sectional view of the sensing device showing the light tubes and the transducers at the exit ends.

FIG. 3 is a cross sectional view of a single tube showing reflecting devices on the upper and lower surfaces. This view also shows how a light beam entering at an angle is reflected toward the transducer.

FIG. 4 is an enlarged cross sectional view of the transducer shown in FIG. 3 and is taken along line 4—4 of that figure.

FIG. 5 is a schematic diagram of connections showing 8 transducers, 8 lamps, a single source of potential, and 8 transistors respectively coupled between each transducer and its associated lamp.

FIG. 6 is a side view of the sensing device as it appears from the leading vehicle.

FIG. 7 is a vew of the instrument panel of the following vehicle showing the arrangement of lamps and a series of distance designations.

FIG. 8 is a plan view of two vehicles indicating the operation of the invention.

FIG. 9 is a side view of one mounting of the sensing device.

FIG. 10 is a schematic diagram of connections which shows the transducers, the lamps, a series of relays, one for each transducer-lamp combination, and an additional set of relay contacts coupled to an alarm system which gives an alarm to the operator of the following vehicle when the vehicles are too close to each other.

Referring now to the drawings, the diagram in FIG. 1 shows two lamps mounted on the rear end of a leading vehicle and separated by a distance A. If the separation between the leading and a following vehicle is a distance B, then the beams of light from the two lamps 20 and 21 converge upon the sensing device 22 at an angle C. The relationships of these quantities are given by the following equation:

$$\tan \frac{C}{2} = \frac{A}{2B} \text{ or } B = \frac{A}{2 \tan \frac{C}{2}}$$

FIGS. 2, 3, 4, and 6 show the construction of the sensing device 22. In FIGS. 2 and 6 eight tubes are mounted in adjoining relationship, each tube set at a different angle for receiving beams of light produced at a distance. Each tube contains side walls which are coated with a non-reflecting coating 23 and, at the exit end of the tube, a light sensitive transducer 24 is mounted. This light sensitive transducer may be any type of photosensitive device such as a photoelectric cell, a photoconductive cell, or any other type of device which transforms light energy into electric energy. A light filter 19 may be placed in each tube to transmit rays having a desired range of wavelengths but these components are not always necessary.

There may be times when one vehicle is moving over the crest of a hill and the following vehicle has not reached the top of the hill. In such a case the light rays from the preceeding vehicle may be at a considerable angle differing from the axis of the hollow tubes. In order to provide for efficient transmission of the light beams so received, a mirror 25 is mounted on the top and bottom of each tube. Light rays entering at an angle can then be reflected in a manner shown by the arrow 26 in FIG. 3 and eventually reach the transducer 24 and actuate it in a manner similar to a beam of light which is transmitted directly from lamps 20 and 21 to the transducer 24.

FIG. 8 shows portions of two vehicles, one a leading vehicle 30 carrying lamps 20 and 21 and a following vehicle 31 which carries the light sensing system 22. It is obvious that when the separation between vehicles is increased, the angle between the two light beams becomes less and the vehicle sensing device permits light to travel through only the central tubes and activate only their associated transducers. When the vehicle separation becomes much less, the angle between light beams is much greater and the beams will then enter the outer tubes and activate their associated transducers. Each transducer is respectively coupled to a single lamp 32 and when the transducer is activated by a light beam, its associated lamp is lighted.

A light panel 33, having the same number of lamps as the sensing device has transducers, is mounted on the instrument panel of each vehicle or in a position where the driver of the vehicle can see it. Such a panel 33 is shown in FIG. 7 where the eight lamps 32 are designated by numbers which may roughly designate the separation of the vehicles in feet. If the two outer lamps are lighted, it means that only 10 feet separate the vehicles. If the two central lamps are lighted it means the two vehicles are 60 feet apart. If one lamp on the left, designated 30, is lighted and another lamp on the right, designated 60, is lighted it means that the front vehicle is making a slight turn to the left and the separation is about 45 feet. In this manner the driver of the following vehicle may determine not only the separation but also the approximate direction of the preceeding vehicle. One of the preferred applications of this invention includes the use of this device on a convoy of vehicles which is proceeding along a road in total darkness. In such an application lamps 20 and 21 are preferably arranged to transmit only infra-red light which is not visible to the naked eye. The transducers 24 are sensitive to infra-red light but must be protected by filters 19 from the ambient light which may be furnished by the head lights of passing automobiles. The use of infra-red light and filters permits vehicles to travel along a road in complete darkness but with the safety requirements which prevent two adjacent vehicles from bumping into each other.

The circuit diagram shown in FIG. 5 is a conventional transistor amplifier arrangement whereby a transducer 24 may be coupled to a lamp 32 by means of a transistor 34, biased by a source of potential 35. Such a coupling means is conventional and is well known in the art.

FIG. 9 shows how a sensing device 22 may be mounted on the front end of a vehicle 31 in a manner which permits the device to swing on a pivot 36 and maintain a horizontal direction. The sensing device is damped by means of a magnet 37 secured to its lower surface and adjacent to a ferro-magnetic surface 38. Such a magnetic damping provides stability for the device and does not permit it to swing too much when the vehicles are passing over rough terrain. A device such as is indicated in FIG. 9 is especially useful for boats which may pitch considerably in rough seas.

The circuit diagram shown in FIG. 10 shows a plurality of photoconductors 24 and indicator lamps 32 coupled to each other by a series of relays 37. Each relay includes a winding 38 and a series of contacts 40 which are connected in series between one of the lamps 32 and a common source of potential 35. Relay windings 38 and contacts 40 operate in the same manner as transistors 34 in FIG. 5 and produce the same result. In FIG. 10, an additional series of contacts 41 is added to provide potential for an alarm circuit 42. The alarm circuit comprises a Wheatstone bridge having three resistors 43, 44 and 45 as three of the arms and a divided resistor 46 as the fourth arm. The intermediate junctions of this series of resistors are connected respectively to each of the contacts 41. Under normal conditions, the combined resistance of all resistors 46 is much larger than is necessary to balance the bridge; however, it is obvious from the circuit diagram that this fourth arm resistance is made variable by the actuation of any two of contacts 41.

An alarm circuit 50 is connected between junction points 47 and 48 in series with a diode rectifier 51. The polarity of rectifier 51 is arranged so that no alarm current can flow as long as the combined resistance of resistors 46 is greater than the resistance of the other four equal arms. When the resistance of components 46 is lower than the resistance of the other arms the bridge is unbalanced and current flows through diode 51 to sound the alarm. The operation of this circuit is as follows: Let it be assumed that the two vehicles are at a safe distance and the received beams are incident upon transducers 24A and 24B thereby actuating the associated relays and closing contacts 41A and 41B. This action short circuits resistor 46A and lowers the combined resistance of the fourth arm of the bridge but not enough to unbalance the bridge in the other direction. Now, let it be assumed that the vehicles are close together and light beams from lamps 20 and 21 are received by transducers 24C and 24D. This causes the actuation of the associated relays and closes contacts 41C and 41D, thereby short circuiting all the resistors 46 in the fourth arm of the bridge except the two end resistors 46B and 46C. This action reduces the resistance in the fourth arm of the bridge to a value which is considerably below the resistance of the other three arms and current flows through diode 51 to sound alarm 50. It should be noted that the operation of the other series of contacts 40 operates to light two of the lamps 32 in the usual manner, this action being independent of the operation of the alarm circuit.

The foregoing disclosure and drawings are merely illustrative of the principles of this invention and are not to be interpreted in a limiting sense. The only limitations are to be determined from the scope of the appended claims.

I claim:

1. A vehicle sensing means for determining the distance between two moving vehicles comprising; a pair of lamps mounted at the rear of a first vehicle for sending two beams of light to a second following vehicle; a light sensing means mounted at the front of said second vehicle and including a plurality of light transferring tubes set in an angular array for selectively receiving light from said lamps; a photosensitive transducer at the exit end of each tube for converting received light into electrical current; and electrical circuit means connected to each of said transducers for applying said currents to a series of lamps, each of said lamps representing a light tube.

2. A vehicle sensing means for determining the distance between two moving vehicles comprising; a pair of lamps mounted at the rear of a first vehicle, spaced apart along a horizontal base, for sending two beams of light to a second following vehicle; a light sensing means mounted at the front of said second vehicle and including a plurality of light transferring tubes set in an angular array on a horizontal base for selectively receiving light from said lamps, a photosensitive transducer at the exit end of each tube for converting received light into electrical current; and electrical circuit means connected to each of said transducers for applying said currents to a series of indicator lamps, each of said indicator lamps representing a light tube, all of the indicator lamps mounted in a position where they can be viewed by a driver of said second vehicle.

3. A vehicle sensing means as claimed in claim 2 wherein said photosensitive transducers are photoconductive elements connected in series with a biasing source of electrical power.

4. A vehicle sensing means as claimed in claim 2 wherein said pair of lamps on the first vehicle are arranged for transmitting infra-red light only.

5. A vehicle sensing means as claimed in claim 2 wherein said transferring tubes each contain a filter which transmits only infra-red light to the photosensitive transducers.

6. A vehicle sensing means as claimed in claim 2 wherein said series of indicator lamps is mounted on a panel containing distance indicating symbols.

7. A vehicle sensing means as claimed in claim 2 wherein said circuit means includes a plurality of amplifier circuits each having an input coupled to a photosensitive transducer and an output coupled to a lamp.

8. A vehicle sensing means as claimed in claim 7 wherein each of said amplifier circuits includes at least one transistor.

9. A vehicle sensing means as claimed in claim 7 wherein each of said amplifier circuits includes a relay having a winding connected to a transducer and a pair of contacts connected in series to a source of electrical power and a lamp.

10. A vehicle sensing means as claimed in claim 9 wherein an extra pair of contacts is mounted for actuation by each relay winding, said contacts each connected respectively in series with a portion of a resistor which forms one arm of a Wheatstone bridge, said bridge having two opposite junction points connected to a source of direct current power and the other two junction points connected in series with an alarm circuit in series with a diode rectifier.

References Cited in the file of this patent

UNITED STATES PATENTS 3,011,580     Reid _____ Dec. 5, 1961